US010984306B2

(12) United States Patent
Brew et al.

(10) Patent No.: US 10,984,306 B2
(45) Date of Patent: *Apr. 20, 2021

(54) BATTERY-BASED NEURAL NETWORK WEIGHTS

(71) Applicant: INTERNATIONAL BUSINESS MACHINES CORPORATION, Armonk, NY (US)

(72) Inventors: Kevin W. Brew, Ronkonkoma, NY (US); Seyoung Kim, White Plains, NY (US); Effendi Leobandung, Stormville, NY (US); Dennis M. Newns, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/802,744

(22) Filed: Nov. 3, 2017

(65) Prior Publication Data

US 2018/0247181 A1  Aug. 30, 2018

Related U.S. Application Data

(63) Continuation of application No. 15/441,338, filed on Feb. 24, 2017.

(51) Int. Cl.
G06N 3/04 (2006.01)
G06N 3/08 (2006.01)
H02J 7/00 (2006.01)
H01C 13/00 (2006.01)
H01M 10/44 (2006.01)
H01M 10/42 (2006.01)
H01M 10/0525 (2010.01)
G06N 3/063 (2006.01)

(52) U.S. Cl.
CPC ............. *G06N 3/04* (2013.01); *G06N 3/0454* (2013.01); *G06N 3/0635* (2013.01); *G06N 3/084* (2013.01);
(Continued)

(58) Field of Classification Search
CPC ...... G06N 3/04; G06N 3/0454; G06N 3/0635; G06N 3/084; H01C 13/00;
(Continued)

(56) References Cited

U.S. PATENT DOCUMENTS

2005/0194936 A1* 9/2005 Cho ..................... H01M 10/48
320/132
2006/0001137 A1* 1/2006 Hundt ............... H01L 23/49575
257/678

(Continued)

FOREIGN PATENT DOCUMENTS

JP          402301880     * 12/1990    ............... G06G 7/60

OTHER PUBLICATIONS

Urone et. al. "College Physics" Ch. 19.1 Electric Potential Energy: Potential Difference. Jun. 2012. (Year: 2012).*

(Continued)

Primary Examiner — Li B. Zhen
Assistant Examiner — Selene A. Haedi
(74) Attorney, Agent, or Firm — Tutunjian & Bitetto, P.C.; Kristofer Haggerty

(57) ABSTRACT

A method for updating the resistance of a controllable resistance element includes determining an amount of resistance change for the controllable resistive element. A charge difference for a battery is determined corresponding to the resistance change for the controllable resistive element. The battery is charged or discharged to effect the resistance change in the controllable resistive element.

14 Claims, 7 Drawing Sheets

(52) U.S. Cl.
CPC ..... *H01M 10/0525* (2013.01); *H01M 10/425* (2013.01); *H01M 10/44* (2013.01); *H02J 7/0072* (2013.01); *H01C 13/00* (2013.01); *H01M 2010/4271* (2013.01); *H02J 7/0063* (2013.01); *H02J 2007/0067* (2013.01)

(58) Field of Classification Search
CPC ........... H01M 10/0525; H01M 10/425; H01M 2010/4271; H01M 10/44; H02J 2007/0067; H02J 7/0063; H02J 7/0072
See application file for complete search history.

(56) References Cited

U.S. PATENT DOCUMENTS

| | | | | |
|---|---|---|---|---|
| 2009/0212741 A1* | 8/2009 | Ferguson | ............. | H02J 7/0021 320/134 |
| 2010/0110767 A1* | 5/2010 | Katoh | ...................... | G11C 8/08 365/148 |
| 2015/0269483 A1* | 9/2015 | Nishitani | ............... | G06N 3/084 706/25 |
| 2018/0260694 A1 | 9/2018 | Bedell | | |

OTHER PUBLICATIONS

Ueda et. al., "Back-Propagation Operation for Analog Neural Network Hardware with Synapse Components Having Hysteresis Characteristics", 2014 (Year: 2014).*

Fuller et. al., "Li-Ion Synaptic Transistor for Low Power Analog Computing", Adv. Materials Journal, Nov. 22, 2016 (Year: 2016).*

Feb. 24, 2017, U.S. Appl. No. 15/441,338.

List of IBM Patents or Patent Applications Treated as Related dated Nov. 3, 2017, 2 pages.

* cited by examiner

US 10,984,306 B2

BATTERY-BASED NEURAL NETWORK WEIGHTS

BACKGROUND

Technical Field

The present invention generally relates to neural networks and, more particularly, to the use of batteries to control weights in an artificial neural network.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

SUMMARY

A method for updating a resistance of a controllable resistive element includes determining an amount of resistance change for the controllable resistive element. A charge difference for a battery corresponding to the resistance change for the controllable resistive element is determined. The battery is charged or discharged to effect the resistance change in the controllable resistive element.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention implement the weights of an artificial neural network (ANN) using batteries. The batteries have a linear relationship between cell voltage and charge/discharge time (or alternatively, between voltage and stored charge) for at least part of its operational range. This property is used to precisely control the voltage state of the batteries, which in turn is used to control an effective resistance through the weight element.

Figure 1:
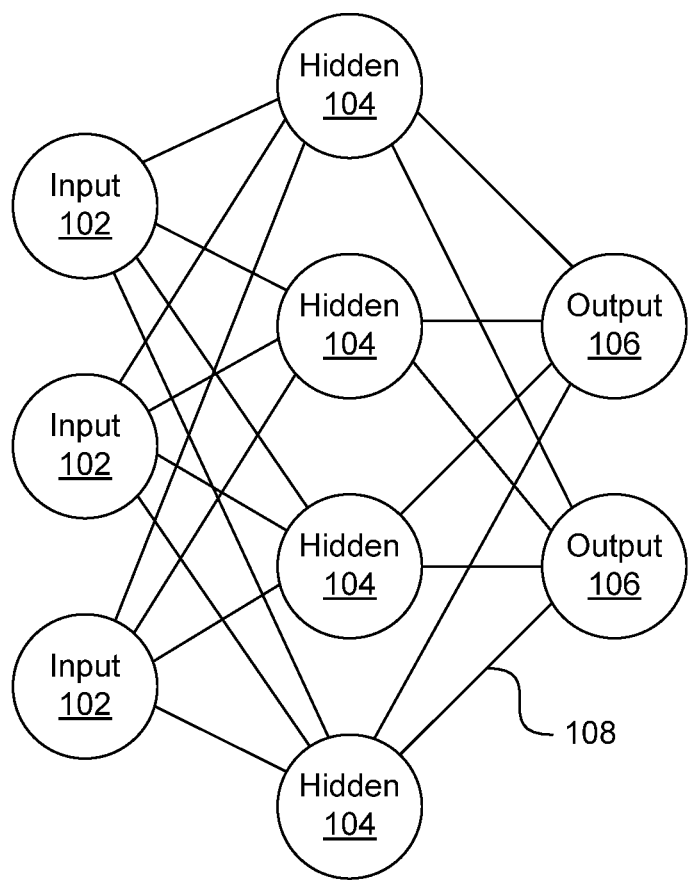
FIG. 1 is a diagram of a neural network.
Figure 2:
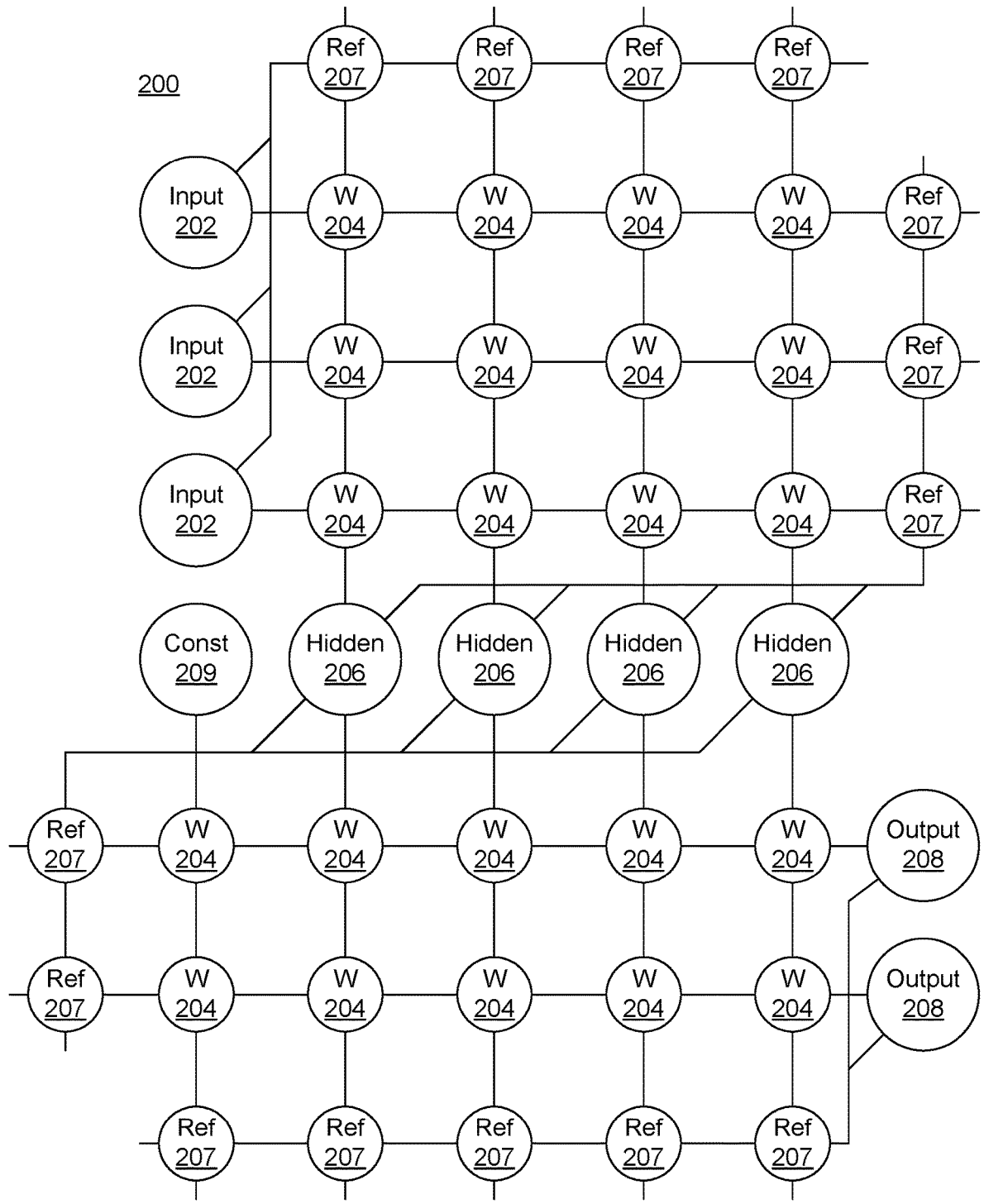
FIG. 2 is a diagram of a neural network having weights initialized to provide dedicated neurons for certain states in accordance with the present principles.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as I=V/r, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The reference weight 207 can also be attach outside of the array, where computation is done between output of input layer to input of hidden layer.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation. During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
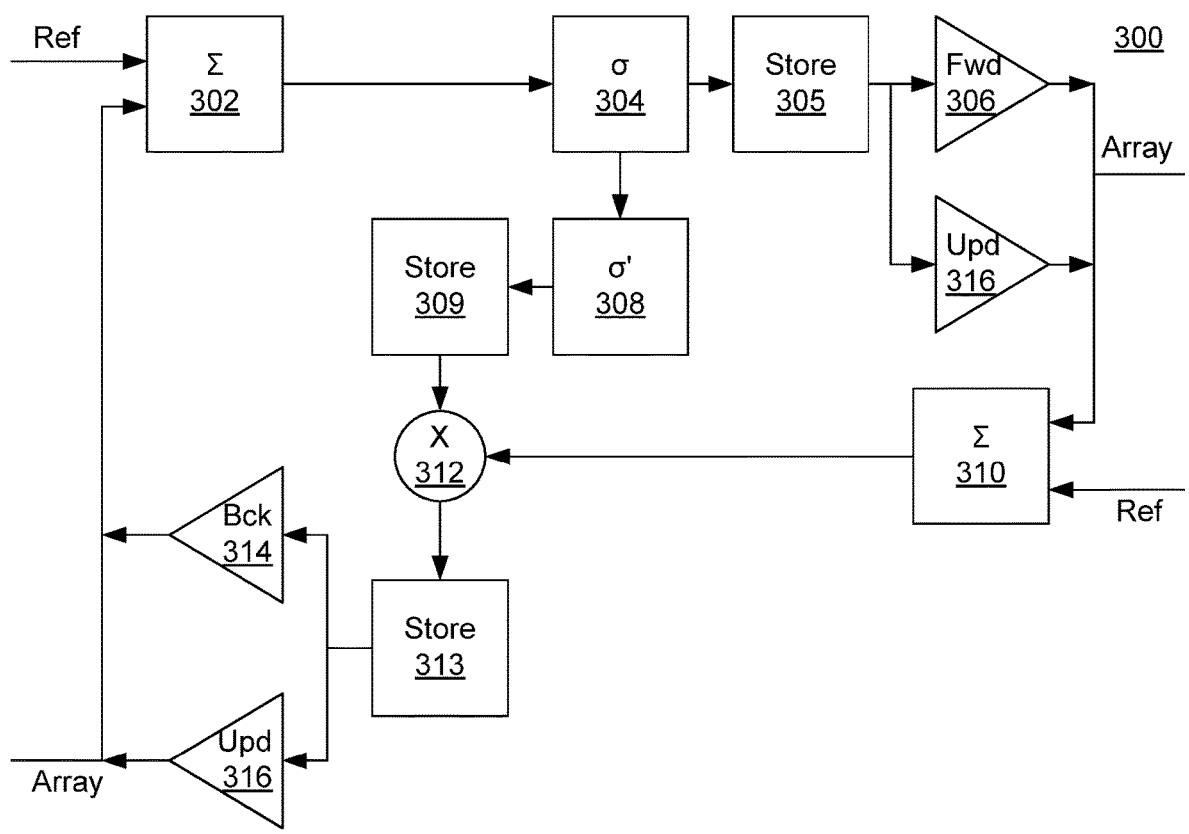
FIG. 3 is a block diagram of circuitry for reading from, writing to, and training a neural network in accordance with the present principles.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In some embodiments, the weights 204 may be implemented in software or in hardware, using relatively complicated weighting circuitry or using resistive cross point devices. Such resistive devices may have switching characteristics that have a non-linearity that can be used for processing data. The weights 204 may belong to a class of device called a resistive processing unit (RPU) and may be used to perform calculations in the neural network 200. The RPU devices may be implemented with resistive random access memory (RRAM), phase change memory (PCM), programmable metallization cell (PMC) memory, or any other device that has non-linear resistive switching characteristics. It is particularly contemplated that the RPU devices may be implemented as voltage-controlled resistors with the voltage being set by charge stored on a battery. Such RPU devices may also be considered as memristive systems.

Figure 4:
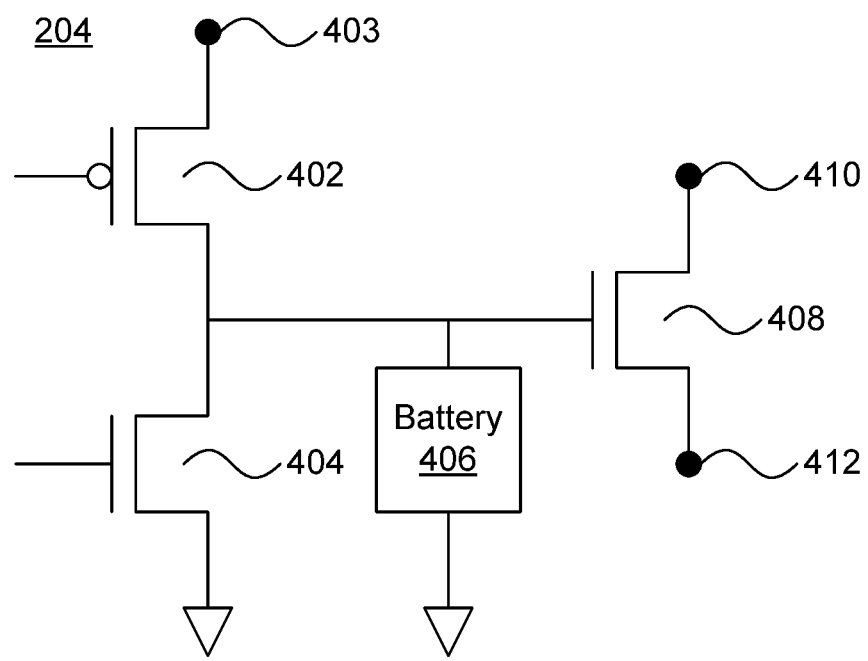
FIG. 4 is a block diagram of circuitry for providing a controllable resistance in accordance with the present principles.

Referring now to FIG. 4, a circuit schematic of a single weight 204 is shown. A write device 402 and an erase device 404 may be implemented as field effect transistors (FETs). In one embodiment, the write device 402 may be implemented as a p-type FET and the erase device 404 may be implemented as an n-type FET, though it should be understood that other configurations may be used, including using alternate types of transistor. The write device 402 can be triggered by a write signal at its gate, which causes current to flow from a current source 403, with charge being stored in battery 406. The device transistor 404 can be triggered by an erase signal at its gate, which causes current to flow from the battery 406 to ground, depleting the charge stored in the battery 406.

When the write device 402 and the erase device 404 are turned off, the charge stored at the battery 406 creates a voltage at the gate of state device 408. It is specifically contemplated that the state device 408 may be implemented as an n-type or p-type Metal Oxide FET (MOSFET). The voltage applied to the gate of the state device 408 causes the state device 408 to act as a variable resistor having a resistance that is linearly determined by the amount of charge stored in the battery 406. Although a MOSFET is specifically contemplated as being a MOSFET, other types of voltage-controlled resistance devices may be used instead.

During a read operation, when the write device 402 and the erase device 404 are turned off, a voltage is applied at an input terminal 410 of the state device 408. The current that flows at the output terminal 412 of the state device 408 is a function of the input voltage and the resistance of the state device 408. The resistance of the state device 408 (and hence of the weight 204) is controlled by the write and erase signals, with each signal increasing or decreasing the resistance of the state device by adding or removing charge to the battery 406.

Figure 5:
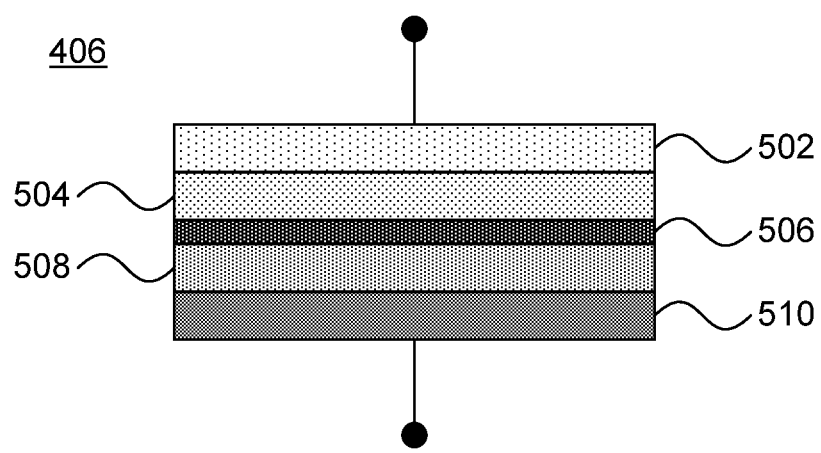
FIG. 5 is a cross-sectional diagram of a battery voltage source for use in a controllable resistance weight in accordance with the present principles.

Referring now to FIG. 5, an exemplary battery 406 is shown. To ensure that the battery voltage stays within the linear range of the state device 408, the battery 406 should have a lowest linear operating charge that corresponds to a voltage that is higher than the threshold voltage of the state device 408. It is also possible to operate the state device 408 in its non-linear range, where the resistance value of the state device 408 is exponential as a function of battery voltage, in which case the battery 406 should have a highest linear operating charge that corresponds to a voltage that is below the threshold voltage of the state device 408. The middle point voltage of the battery 406 should be between the write voltage 403 and ground.

In one particular embodiment, the battery 406 may be a thin-film lithium ion battery that includes a cathode collector 502 and a cathode 504. The cathode collector 502 may be formed using any appropriate conductive material including, e.g., copper, tungsten, silver, gold, platinum, titanium, tantalum, ruthenium, zirconium, cobalt, aluminum, tin, alloys thereof, graphite, graphene, carbon nanotubes, and other metallic and non-metallic conductors. The cathode 504 may be formed from an appropriate material such as, e.g., $LiMn_2O_4$, $LiCoO_2$, or $LiFePO_4$, with $LiMn_2O_4$ being specifically contemplated. The cathode material should have a flat discharge curve, which characterizes the voltage of the cell as the stored charge changes.

An electrolyte layer 506 separate the cathode 504 from an anode 508. It is specifically contemplated that the electrolyte layer 506 may be formed from a solid electrolyte material such as, e.g., LiPON, but alternative materials may be used instead. In other embodiments, a fluid electrolyte may be used in conjunction with a non-conductive separator between the cathode 504 and the anode 508.

The anode may be formed from any appropriate material such as, e.g., $Li_4Ti_5O_{12}$ and is in contact with an anode collector 510. The anode collector 510, like the cathode collector 502 may be formed using any appropriate conductive material including, e.g., copper, tungsten, silver, gold, platinum, titanium, tantalum, ruthenium, zirconium, cobalt, aluminum, tin, alloys thereof, graphite, graphene, carbon nanotubes, and other metallic and non-metallic conductors. The anode collector 510 may be formed from the same material as the cathode collector 502, or the two collectors may be formed from different materials.

Diffusivity of charges through the anode 508 into a steady state should be fast enough to support the cycle time of the neural network, such that changes made to the states of the weights 204 settle before a read operation is performed. Furthermore, charging and discharging times for a given amount of charge should be as symmetric as possible.

Although the thin-film lithium-ion battery described above can be made particularly small and is thus suitable for integrating in a hardware-based ANN, other types of batteries may be used instead. Alternative battery chemistries include potassium batteries, nickel-zinc batteries, and rechargeable alkaline batteries. As long as the battery 406 supplies predictable voltages relative to the charge and discharge times supplied by the write signal and the erase signal, the battery 406 can be used to control the resistance of the state device 408 and, thus, of the weight 204.

Figure 6:
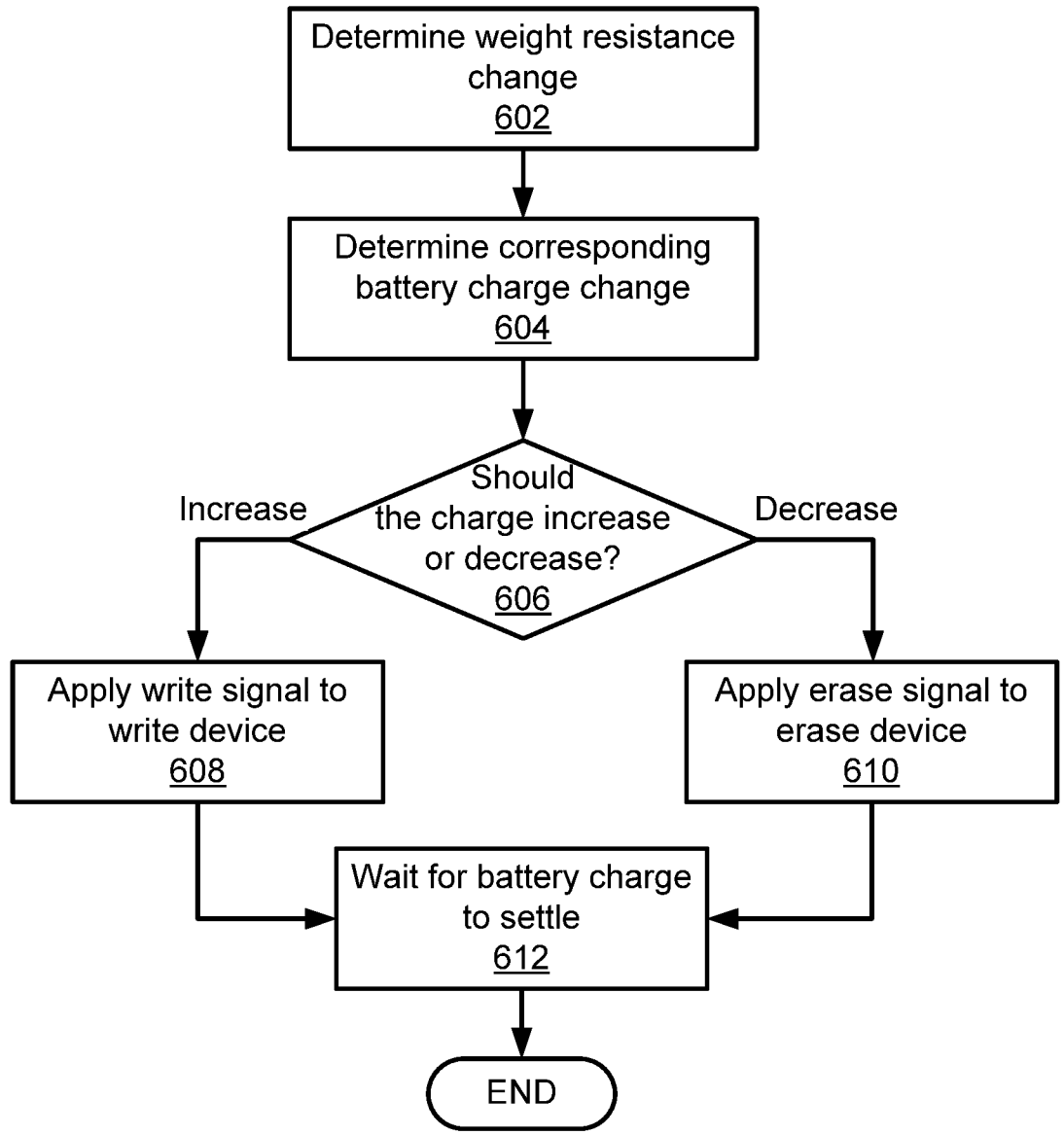
FIG. 6 is block/flow diagram of a method for changing a weight resistance in accordance with the present principles.

Referring now to FIG. 6, a method of controlling the resistance value of a weight 204 is shown. This process may be performed during training of an ANN to adjust the values of any weights 204 and to bring the output of the ANN closer to the expected trained output. Block 602 determines the weight resistance change for each weight 204 that is needed according to a difference between the ANN's output and the expected output from a training corpus. Block 604 determines how much the voltage at the state device 408 needs to change to create the target resistance and then determines how much the stored charge in the battery 406 needs to change to create the target voltage.

Block 606 determines whether the change in charge reflects an increase in the charge stored at the battery 406 or a decrease in such charge. If an increase in charge is needed, a write signal is applied to the write device 402 at block 608. The write signal has a duration calculated to add the determined amount of charge to the battery 406. If a decrease in charge is needed, an erase signal is applied to the erase device 404 at block 610. The erase signal has a duration calculated to permit the battery 406 to discharge the determined amount of charge to ground.

After the charge on the battery 406 has either increased or decreased, block 612 waits for the battery charge to settle. The battery 406 needs a small amount of time for the stored charges to diffuse to a steady state to produce a stable voltage. Once this time has elapsed, the weight 204 will provide the correct resistance value and can be used for ANN calculations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 7:
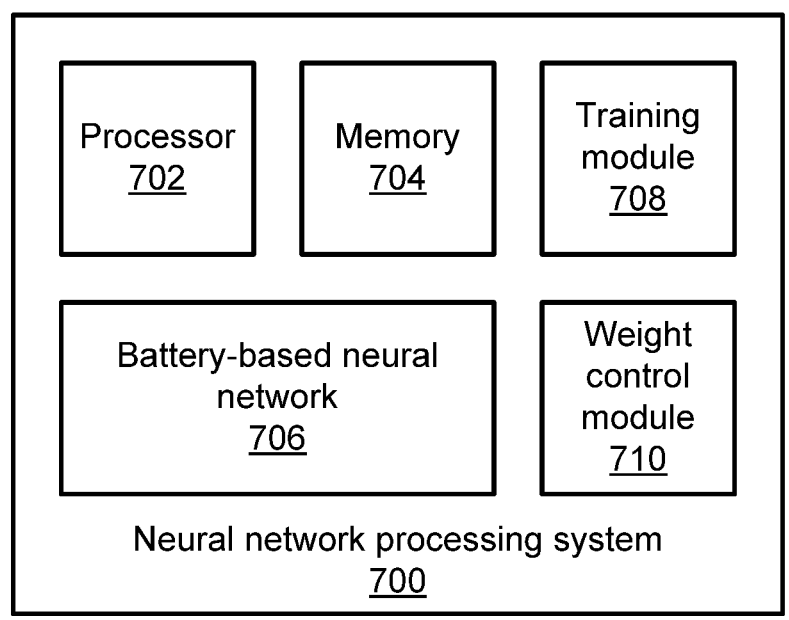
FIG. 7 is a block diagram of a neural network processing system in accordance with the present principles.

Referring now to FIG. 7, a neural network processing system 700 is shown. The neural network processing system 700 includes a hardware processor 702 and a memory 704. A battery-based neural network 706 includes a set of input neurons 202, one or more sets of hidden neurons 206, and a set of output neurons, with battery-controlled variable resistive weights 204 as described above. In addition, the neural network processing system 700 includes functional modules that may be implemented as software that is stored in memory 704 and executed by processor 702. In alternative embodiments, the functional modules may be implemented as one or more discrete hardware components in the form of, e.g., an application-specific integrated chip or field programmable gate array.

For example, a training module 708 uses training data that is stored in the memory 704 to train the battery-based neural network 706. As the training module 708 processes the training data, the training module 708 determines errors between the neural network output and the expected results. These errors are used as a basis for updates to the weights 204 of the battery-based neural network 706. A weight control module 710 alters the resistance values of the weights 204 in the battery-based neural network 706 as described above, issuing write and erase signals to the weights 204 as needed.

Figure 8:
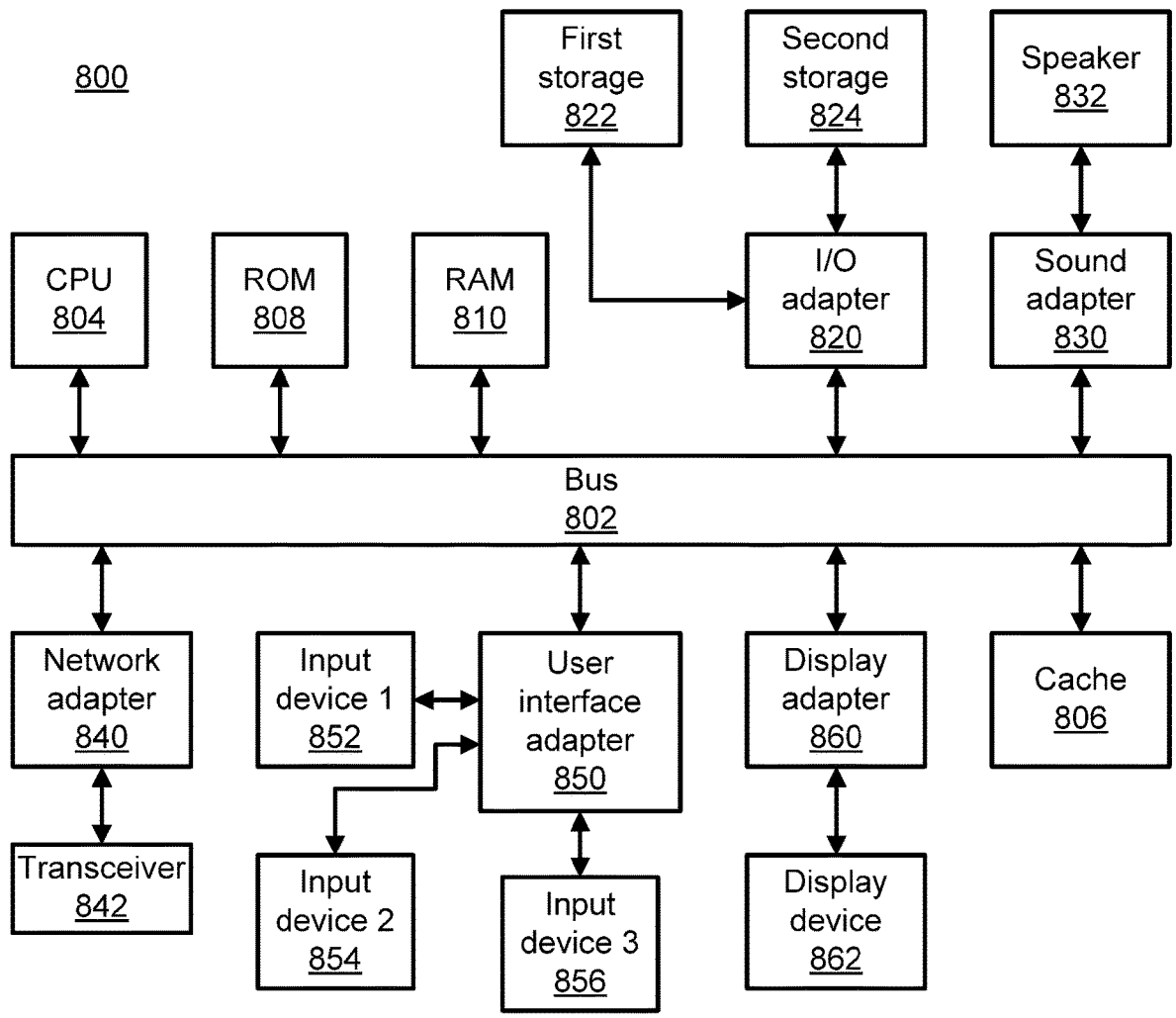
FIG. 8 is a block diagram of a processing system in accordance with the present principles.

Referring now to FIG. 8, an exemplary processing system 800 is shown which may represent elements of the neural network processing system 700. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of battery-based neural network weights (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for updating a resistance of a controllable resistive element, comprising:
   determining an amount of resistance change for the controllable resistive element, wherein the controllable resistive element is a weight in a neural network between neuron layers;
   determining a charge difference for a battery corresponding to the resistance change for the controllable resistive element;
   and
   charging or discharging the battery to effect the resistance change in the controllable resistive element.

2. The method of claim 1, wherein the controllable resistive element comprises a metal oxide semiconductor field effect transistor.

3. The method of claim 1, wherein the battery is a thin-film lithium-ion battery.

4. The method of claim 1, wherein charging the battery comprises applying a write signal to the gate of a transistor to cause current to flow from a voltage source to the battery for a duration of the write signal.

5. The method of claim 1, wherein discharging the battery comprises applying an erase signal to the gate of a transistor to cause current to flow from the battery to ground for a duration of the erase signal.

6. The method of claim 1, wherein the battery applies a voltage to the controllable resistive element based on a stored charge in the battery.

7. The method of claim 6, wherein the battery is configured to provide a linear relationship between the voltage it applies to the voltage input of the controllable resistive element and an amount of time that the battery is charged or discharged.

8. The method of claim 1, wherein the controllable resistive element is a weight in an artificial neural network.

9. A method for updating a resistance of a controllable resistive element, comprising:
- determining an amount of resistance change for the controllable resistive element, wherein the controllable resistive element is a weight in a neural network between neuron layers;
- determining a charge difference for a battery corresponding to the resistance change for the controllable resistive element;
- determining whether the battery needs to be charged or discharged to effect the resistance change in the controllable resistive element;
- if the battery needs to be charged, applying a write signal to the gate of a write transistor to cause current to flow from a voltage source to the battery for a duration of the write signal; and
- if the battery needs to be discharged, applying an erase signal to the gate of an erase transistor to cause current to flow from the battery to ground for a duration of the erase signal.

10. The method of claim 9, wherein the controllable resistive element comprises a metal oxide semiconductor field effect transistor.

11. The method of claim 9, wherein the battery is a thin-film lithium-ion battery.

12. The method of claim 9, wherein the battery applies a voltage to the controllable resistive element based on a stored charge in the battery.

13. The method of claim 12, wherein the battery is configured to provide a linear relationship between the voltage it applies to the voltage input of the controllable resistive element and an amount of time that the battery is charged or discharged.

14. The method of claim 9, wherein the controllable resistive element is a weight in an artificial neural network.

* * * * *